United States Patent
Schaff et al.

(10) Patent No.: US 10,228,870 B2
(45) Date of Patent: Mar. 12, 2019

(54) REDUNDANT WRITE TRANSFER DETECTION

(71) Applicant: SEAGATE TECHNOLOGY LLC, Cupertino, CA (US)

(72) Inventors: Michael D. Schaff, Longmont, CO (US); Abhay T. Kataria, Longmont, CO (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 100 days.

(21) Appl. No.: 15/015,899

(22) Filed: Feb. 4, 2016

(65) Prior Publication Data

US 2017/0228174 A1   Aug. 10, 2017

(51) Int. Cl.
  *G06F 3/00* (2006.01)
  *G06F 3/06* (2006.01)

(52) U.S. Cl.
  CPC ............ *G06F 3/0619* (2013.01); *G06F 3/064* (2013.01); *G06F 3/0637* (2013.01); *G06F 3/0673* (2013.01)

(58) Field of Classification Search
  None
  See application file for complete search history.

(56) References Cited

U.S. PATENT DOCUMENTS

| | | | |
|---|---|---|---|
| 5,333,290 A * | 7/1994 | Kato | G06F 13/28 710/26 |
| 5,890,219 A | 3/1999 | Scaringella et al. | |
| 7,177,979 B2 | 2/2007 | Kuwamura | |
| 2012/0011424 A1* | 1/2012 | Schuette | G06F 11/1048 714/807 |
| 2015/0113205 A1 | 4/2015 | Cai et al. | |
| 2016/0041772 A1* | 2/2016 | Dahlen | G06F 12/0893 711/154 |

* cited by examiner

*Primary Examiner* — Midys Rojas
(74) *Attorney, Agent, or Firm* — Holland & Hart (57) ABSTRACT

Systems and methods for redundant write transfer detection are described. In one embodiment, the systems and methods may include identifying a starting logical block address (LBA) associated with a request to write a first data set to the storage device, storing the first data set on a storage medium of the storage device, storing the identified starting LBA of the first data set in a memory associated with the storage device, identifying a starting LBA associated with a request to write a second data set to the storage device, comparing the starting LBA of the second data set to the starting LBA of the first data set stored in the memory, and upon identifying a match between the starting LBA of the second data set and the starting LBA of the first data set, suspending the request to write the second data set to the storage device.

20 Claims, 7 Drawing Sheets

FIG. 7

REDUNDANT WRITE TRANSFER DETECTION

SUMMARY

The present disclosure is directed to methods and systems for redundant write transfer detection. In some embodiments, the present systems and methods may perform a write-verify operation in relation to a request to write a data set to a storage device.

A storage device for redundant write transfer detection is described. In one embodiment, the storage device may include a storage controller operable to identify a starting logical block address (LBA) associated with a request to write a first data set to the storage device, store the first data set on a storage medium of the storage device, store the identified starting LBA of the first data set in a memory associated with the storage device, identify a starting LBA associated with a request to write a second data set to the storage device, compare the starting LBA of the second data set to the starting LBA of the first data set stored in the memory, and upon identifying a match between the starting LBA of the second data set and the starting LBA of the first data set, suspend the request to write the second data set to the storage device. In some embodiments, the memory includes at least one of random access memory, flash memory, non-volatile memory, and volatile memory, and the storage medium includes at least one of a magnetic storage medium and a solid state storage medium.

In some embodiments, the storage controller may allow the request to write the second data set to the storage device to proceed upon identifying no match from the compare, identify at least one of a checksum and a parity value associated with the first data set, store the identified checksum in the memory upon identifying the checksum of the first data set, and store the identified parity value in the memory upon identifying the parity value of the first data set. In some configurations, the storage controller may identify at least one of a checksum and a parity value associated with the second data set and compare at least one of the checksum and parity value of the second data set to at least one of the stored checksum and stored parity value of the first data set.

In some embodiments, the storage controller may suspend the request to write the second data set to the storage device upon identifying a match between at least one of the checksum of the second data set and the stored checksum of the first data set, and the parity value of the second data set and the stored parity value of the first data set. In some cases, the storage controller may allow the request to write the second data set to the storage device to proceed upon identifying no match between at least one of the checksum and parity value of the second data and the stored checksum and stored parity value of the first data set. In some embodiments, the storage controller may track a count of matching requests, the count of matching requests comprising a count of a number of requests made to write a data set subsequent to the first data set that matches at least one of the starting LBA, checksum, and parity value of first data set. In some cases, the storage controller may determine whether the count of matching requests satisfies a predetermined request threshold and allow a current request to write a matching data set to the storage device to proceed upon determining the count of matching requests satisfies the predetermined request threshold.

A method for redundant write transfer detection is also described. In one embodiment, the method may include identifying a starting logical block address (LBA) associated with a request to write a first data set to the storage device, storing the first data set on a storage medium of the storage device, storing the identified starting LBA of the first data set in a memory associated with the storage device, identifying a starting LBA associated with a request to write a second data set to the storage device, comparing the starting LBA of the second data set to the starting LBA of the first data set stored in the memory, and upon identifying a match between the starting LBA of the second data set and the starting LBA of the first data set, suspending the request to write the second data set to the storage device.

An apparatus for redundant write transfer detection is also described. In one embodiment, the apparatus may include a processor, memory in electronic communication with the processor, and instructions stored in the memory, the instructions being executable by the processor to perform the steps of identifying a starting logical block address (LBA) associated with a request to write a first data set to the storage device, storing the first data set on a storage medium of the storage device, storing the identified starting LBA of the first data set in a memory associated with the storage device, identifying a starting LBA associated with a request to write a second data set to the storage device, comparing the starting LBA of the second data set to the starting LBA of the first data set stored in the memory, and upon identifying a match between the starting LBA of the second data set and the starting LBA of the first data set, suspending the request to write the second data set to the storage device.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

The following relates generally to redundant write transfer detection. In one embodiment, a storage device may receive a request to write a first data set to a storage medium of the storage device. In some embodiments, the storage device may determine whether the data set is already written to the storage medium. In one embodiment, the storage device may identify a starting logical block address (LBA) associated with the data unit. Logical block addressing specifies the location of blocks of data stored on computer storage devices such as hard disk drives, etc. Blocks may be located by an integer index, with the first block being LBA 0, the second LBA 1, and so on. The storage device may store the identified starting LBA in memory such as a host's system memory, a memory on the storage device, etc. Additionally, or alternatively, the storage device may identify a checksum and/or a parity value associated with the data set from the write request. A checksum or hash sum is a small-size datum from a block of digital data for the purpose of detecting errors which may have been introduced during its transmission or storage. The checksum may include a count of the number of bits in a data set that is included with the data set so that the receiver can check to see whether the same number of bits arrived. If the counts match, it may be assumed that the complete transmission is received. The parity value may include one or more parity bits, bits added to the end of a string of binary code that indicates whether the number of bits in the string with the value one is even or odd. In some cases, the parity value may be based on a parity sector. A parity sector may include error detection/correction check bits corresponding to a number of data sectors of a storage device. One or more M parity sectors may be used for every predetermined number K data sectors such as one parity sector (M=1) for each 10 sectors of data (K=10), as one example. In some cases, K data sectors may have multiple parity sectors such as M=3 parity sectors for every K=20 data sectors. In some cases, the 3 parity sectors may be redundant copies of each other. The storage device may store the checksum and/or parity value in memory.

In some embodiments, the storage device may receive a request to write a second data set to the storage device. The storage device may determine whether the second data set matches a data set already written to the storage device. For example, the second data set may match the first data set. To determine whether there is a match, the storage device may identify one or more attributes of the second data set. For example, the storage device may identify a starting LBA, checksum, and/or a parity value associated with the second data set. The storage device may then compare the starting LBA, checksum, and/or a parity value from the second data set with equivalent attributes from other data sets that are previously stored in memory. For example, the storage device may compare the starting LBA of the first data set stored in memory with the starting LBA of the second data set. If there is a match, the storage device may suspend and/or deny the request to write the second data set to the storage device. If no match is found for the one or more identified attributes of the second data set, the storage device may allow the request to proceed.

Figure 1:
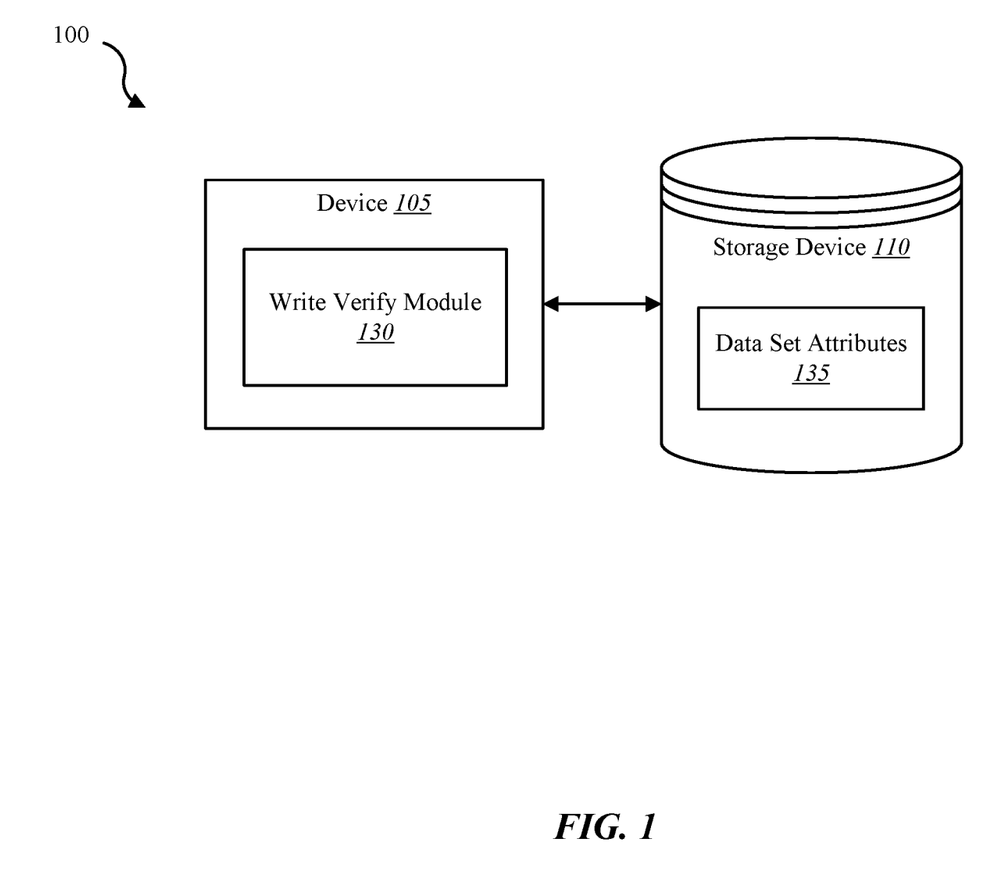
FIG. 1 is a block diagram of an example of a system in accordance with various embodiments of this disclosure.

FIG. 1 is a block diagram illustrating one embodiment of an environment 100 in which the present systems and methods may be implemented. The environment may include device 105 and storage device 110. The storage device 110 may include any combination of hard disk drives, solid state drives, and/or hybrid drives that include both hard disk and solid state storage mediums. The storage device 110 may include a volatile cache such as a disk buffer, static random access memory (RAM), dynamic RAM, etc. The volatile cache may hold data temporarily such as new data to be stored on the storage device 110 and/or data already stored at a first storage location of storage device 110 being transferred to a second storage location. The main store may include media on the storage device 110 accessible to a user. For example, a user that stores a file on storage device 110 may store the file in the main store of storage device 110. As depicted, storage device 110 may include data set attributes 135. The data set attributes 135 may include attributes of one or more data sets stored on a storage medium of storage device 110. For example, data set attributes 135 may include a logical block address (LBA) of a data set, a starting LBA of a data set, parity information associated with of a data set, checksum information associated with of a data set, size of a data set such as in megabytes, one or more data types associated with a data set, etc. The data set attributes 135 may be stored on a storage medium of storage device 110 and/or memory such as RAM or a volatile cache of storage device 110. Although depicted as part of storage device 110, in some cases data set attributes 135 may be stored independent and/or outside of storage device 110 such as in host RAM (e.g., RAM of a computer system hosting the storage device 110 such as device 105).

In some embodiments, the systems and methods described herein may be performed on a single device (e.g., device 105). In some cases, the methods described herein may be performed on multiple storage devices or a network of storage devices. Examples of device 105 include a computing device, a storage server, a storage device enclosure, a storage controller, storage drives in a distributed storage system, storage drives on a cloud storage system, storage devices on personal computing devices, storage devices on a server, etc. In some configurations, device 105 may include a write verify module 130. In one example, the device 105 may be coupled to storage device 110. In some embodiments, device 105 and storage device 110 may be components of a storage drive such as a hard disk drive, solid state drive, etc. Alternatively, device 105 may be a component of a host (e.g., operating system, host hardware system, etc.) of the storage device 110.

In one embodiment, device 105 may be a computing device with one or more processors, memory, one or more storage devices, and/or operating systems, etc. Accordingly, in some embodiments, data set attributes 135 may be stored in device 105. In some cases, device 105 may include a wireless storage device. In some embodiments, device 105 may include a cloud drive for a home or office setting. In one embodiment, device 105 may include a network device such as a switch, router, access point, etc. In one example, device 105 may be operable to receive data streams, store and/or process data, and/or transmit data from, to, or in conjunction with one or more local and/or remote computing devices.

The device 105 may include a database. In some cases, the database may be internal to device 105. For example, storage device 110 may include a database. Additionally, or alternatively, the database may include a connection to a wired and/or a wireless database. Additionally, as described in further detail herein, software and/or firmware (e.g., stored in memory) may be executed on a processor of device 105. Such software and/or firmware executed on the processor may be operable to cause the device 105 to monitor, process, summarize, present, and/or send a signal associated with the operations described herein.

In some embodiments, storage device 110 may connect to device 105 via one or more networks. Examples of networks include cloud networks, local area networks (LAN), wide area networks (WAN), virtual private networks (VPN), a personal area network, near-field communication (NFC), a telecommunications network, wireless networks (using 802.11, for example), and/or cellular networks (using 3G and/or LTE, for example), etc. In some configurations, the network may include the Internet and/or an intranet. The device 105 may receive and/or send signals over a network via a wireless communication link. In some embodiments, a user may access the functions of device 105 via a local computing device, remote computing device, and/or network device. For example, in some embodiments, device 105 may include an application that interfaces with a user. In some cases, device 105 may include an application that interfaces with one or more functions of a network device, remote computing device, and/or local computing device.

In one embodiment, the storage device 110 may be internal to device 105. As one example, device 105 may include a storage controller that interfaces with storage media of storage device 110. Storage device 110 may include a hard disk drive, solid state drive, etc. Write verify module 130 may receive requests to write data sets to a storage medium of storage device 110. Upon receiving such as request, write verify module 130 may identify one or more attributes of the data set and store these data set attributes 135 for future reference. In some embodiments, write verify module 130 may store the data set attributes 135 on device 105 such as in a memory or storage device of device 105. Write verify module 130 may reference the data set attributes 135 of previously stored data sets to determine whether a current write request is for a data set already written to a storage medium of storage device 110.

Figure 2:
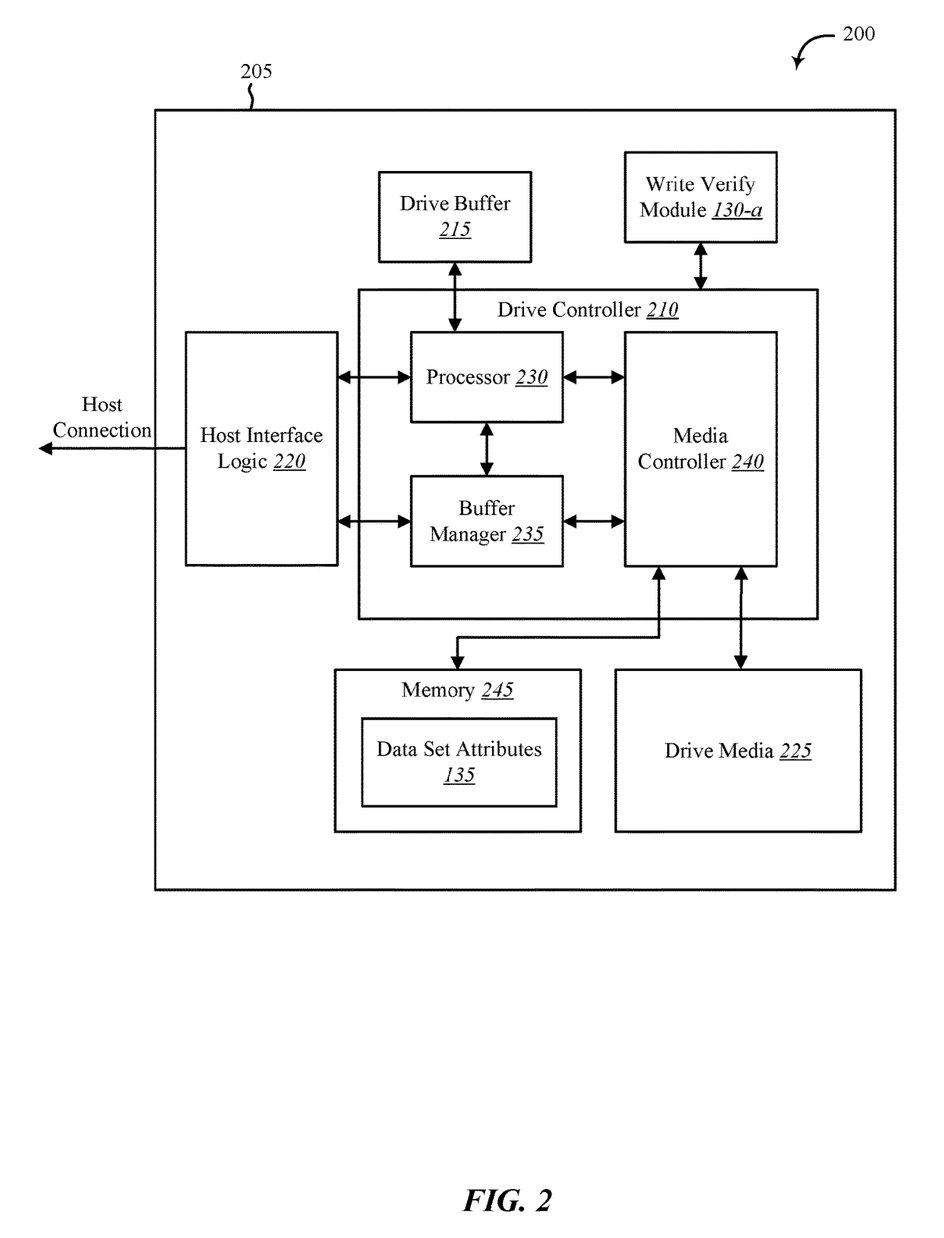
FIG. 2 shows a block diagram of a device in accordance with various aspects of this disclosure.

FIG. 2 shows a block diagram 200 of an apparatus 205 for use in electronic communication, in accordance with various aspects of this disclosure. The apparatus 205 may be an example of one or more aspects of device 105 described with reference to FIG. 1. The apparatus 205 may include a drive controller 210, drive buffer 215, host interface logic 220, drive media 225, memory 245, and write verify module 130-a. Each of these components may be in communication with each other and/or other components directly and/or indirectly.

One or more of the components of the apparatus 205, individually or collectively, may be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

In one embodiment, the drive controller 210 may include a processor 230, a buffer manager 235, and a media controller 240. The drive controller 210 may process, via processor 230, read and write requests in conjunction with the host interface logic 220, the interface between the apparatus 205 and the host of apparatus 205 (e.g., an operating system, host hardware system, etc.). The drive buffer 215 may hold data temporarily for internal operations of apparatus 205. For example, a host may send data to apparatus 205 with a request to store the data on the drive media 225. The driver controller 210 may process the request and store the received data in the drive media 225. In some cases, a portion of data stored in the drive media 225 may be copied to the drive buffer 215 and the processor 230 may process or modify this copy of data and/or perform an operation in relation to this copy of data held temporarily in the drive buffer 215.

In some embodiments, memory 245 may include data set attributes 135. Upon receiving a request to write a data set to drive media 225, drive controller 210 may identify one or more attributes of the data set such as a starting LBA of a data set, parity information associated with of a data set, checksum information associated with of a data set, size of a data set such as in megabytes, one or more data types associated with a data set, etc. Drive controller 210 may store at least one of the one or more identified attributes associated with the data set in memory 245. Thus, data set attributes 135 may include identified attributes of one or more data sets written to drive media 225. In some embodiments, driver controller may store identified attributes in an external memory device such as system memory of a host hosting device 205.

Although depicted outside of drive controller 210, in some embodiments, write verify module 130-a may include software, firmware, and/or hardware located within drive controller 210. For example, write verify module 130-a may include at least a portion of processor 230, buffer manager 235, and/or media controller 240. In one example, write verify module 130-a may include one or more instructions executed by processor 230, buffer manager 235, and/or media controller 240. The write verify module 130-a may be configured to minimize writing copies of data sets already written to drive media 225.

Figure 3:
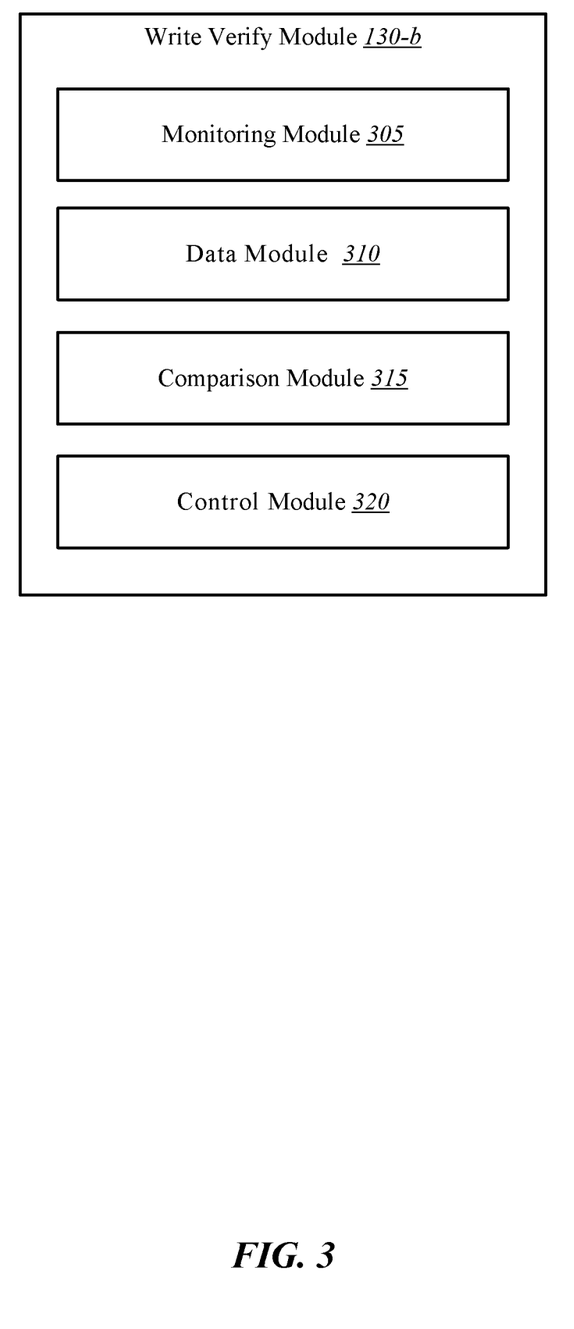
FIG. 3 shows a block diagram of one or more modules in accordance with various aspects of this disclosure.

FIG. 3 shows a block diagram 300 of a write verify module 130-b. The write verify module 130-b may include one or more processors, memory, and/or one or more storage devices. The write verify module 130-b may include monitoring module 305, data module 310, comparison module 315, and control module 320. The write verify module 130-b may be one example of write verify module 130 of FIGS. 1 and/or 2. Each of these components may be in communication with each other.

In one embodiment, write verify module 130 may receive a request to write a data set to a storage device. In some cases, write verify module 130 may receive a request to write a data set that is already written to the storage device. Accordingly, write verify module 130 may analyze the request and determine whether to allow the write request to proceed or whether to suspend or deny the request to write the data set. In one embodiment, one or more aspects and/or components of write verify module 130 may operate in conjunction with a storage controller (e.g., drive controller 210 of FIG. 2).

In one embodiment, monitoring module 305 may identify a starting logical block address (LBA) associated with a request to write a first data set to the storage device. Additionally, or alternatively, monitoring module 305 may identify at least one of a checksum and a parity value associated with the first data set. In some embodiments, data module 310 may store the first data set on a storage medium of the storage device. In some cases, the storage medium includes at least one of a magnetic storage medium, a solid state storage medium, a hybrid storage medium that include both magnetic and solid state storage mediums, etc.

In some embodiments, data module 310 may store the identified starting LBA of the first data set in a memory associated with the storage device. In some cases, the memory includes at least one of random access memory, flash memory, non-volatile memory, and volatile memory. The memory may be in a storage device and/or external to the storage device such as system memory of a system hosting the storage device. Additionally, or alternatively, data module 310 may store the identified checksum in the memory upon identifying the checksum of the first data set. In some cases, data module 310 may store the identified parity value in the memory upon identifying the parity value of the first data set. In some embodiments, the data module 310 may determine whether there is space in the memory to hold the starting LBA, checksum, and/or parity value of the current data set being analyzed. If there is space available in the memory, then the data module 310 may copy the data to the memory. If there is no space available, in some embodiments, the data module 310 may copy the starting LBA, checksum, and/or parity value of the data set to the storage medium of the storage device (e.g., a track of a hard disk drive, or one or more memory cells of a solid state storage device).

In some embodiments, monitoring module 305 may identify a starting LBA associated with a request to write a second data set to the storage device. The request to write the second data set may occur after receiving the request to write the first data set. In some cases, comparison module 315 may compare the starting LBA of the second data set to the starting LBA of the first data set stored in the memory. Upon identifying a match between the starting LBA of the second data set and the starting LBA of the first data set, control module 320 may suspend the request to write the second data set to the storage device. Identifying a match between the starting LBA of the second data set and the starting LBA of the first data set may indicate that the second data set is identical to the first data set.

In some embodiments, control module 320 may deny the request to write the second data set to the storage device upon determining the starting LBA of the second request matches the starting LBA of the first data set stored in memory. Alternatively, control module 320 may allow the request to write the second data set to the storage device to proceed upon identifying no match from the compare. In some embodiments, control module 320 may allow the request to write the second data set to the storage device after suspending the request. For example, write verify module 130 may receive a request to write a data set that matches the first data set already written to the storage device. Accordingly, control module 320 may suspend this first request for a predetermined time. Upon receiving one or more subsequent requests to write the matching data set to the storage device and determining the predetermined time has not lapsed, control module 320 may continue to suspend the first request while denying the subsequent requests that occur before the predetermined time lapses. Upon receiving a request to write the matching data set after determining the predetermined time has lapsed, control module 320 may allow the suspended request to proceed, enabling the matching data set to be written to the storage device. Thus, in some embodiments, control module 320 may allow the suspended request to proceed if a request occurs after the predetermined time lapses. If a request to write the matching data set does not occur after the predetermined time lapses, in some cases control module 320 may cancel or remove the suspended request. For example, the suspended request may time out (e.g., after a predetermined time out period) when no further requests are received after the predetermined time lapses.

In some embodiments, monitoring module 305 may identify at least one of a checksum and a parity value associated with the second data set. In some configurations, comparison module 315 may compare the checksum of the second data set to the stored checksum of the first data set. Additionally, or alternatively, comparison module 315 may compare the parity value of the second data set to the stored parity value of the first data set. In some cases, control module 320 may suspend the request to write the second data set to the storage device upon identifying a match between the checksum of the second data set and the stored checksum of the first data set. Additionally, or alternatively, control module 320 may suspend the request to write the second data set to the storage device upon identifying a match between the parity value of the second data set and the stored parity value of the first data set. In some embodiments, control module 320 may allow the request to write the second data set to the storage device to proceed upon identifying no match between the checksum of the second data and the stored checksum of the first data set. Additionally, or alternatively, control module 320 may allow the request to write the second data set to the storage device to proceed upon identifying no match between the parity value of the second data and the stored parity value of the first data set.

In some embodiments, monitoring module 305 may track a count of requests to write a data set that matches the first data set. The count of matching requests may include a count of a number of requests made to write a data set subsequent to the first data set that matches at least one of the starting LBA, checksum, and parity value of the first data set, indicating the requested data set matches the first data set already written to the storage device. In some embodiments, control module 320 may determine whether the count of matching requests satisfies a predetermined request threshold. In some cases, control module 320 may allow a current request to write a matching data set to the storage device to proceed upon determining the count of matching requests satisfies the predetermined request threshold. As one example, the predetermine request threshold may be set at 100. Thus, up to receiving 100 requests to write a data set matching the first data set, control module 320 may deny each request. However, upon receiving 100 requests to write a data set matching the first data set, control module 320 may allow this current request to proceed. Accordingly, the matching data set may be written to the storage device. In some cases, the matching data set may be written to the same location as the first data set. Thus, the matching data set allowed to be written may overwrite the first data set previously written to the storage device.

Figure 4:
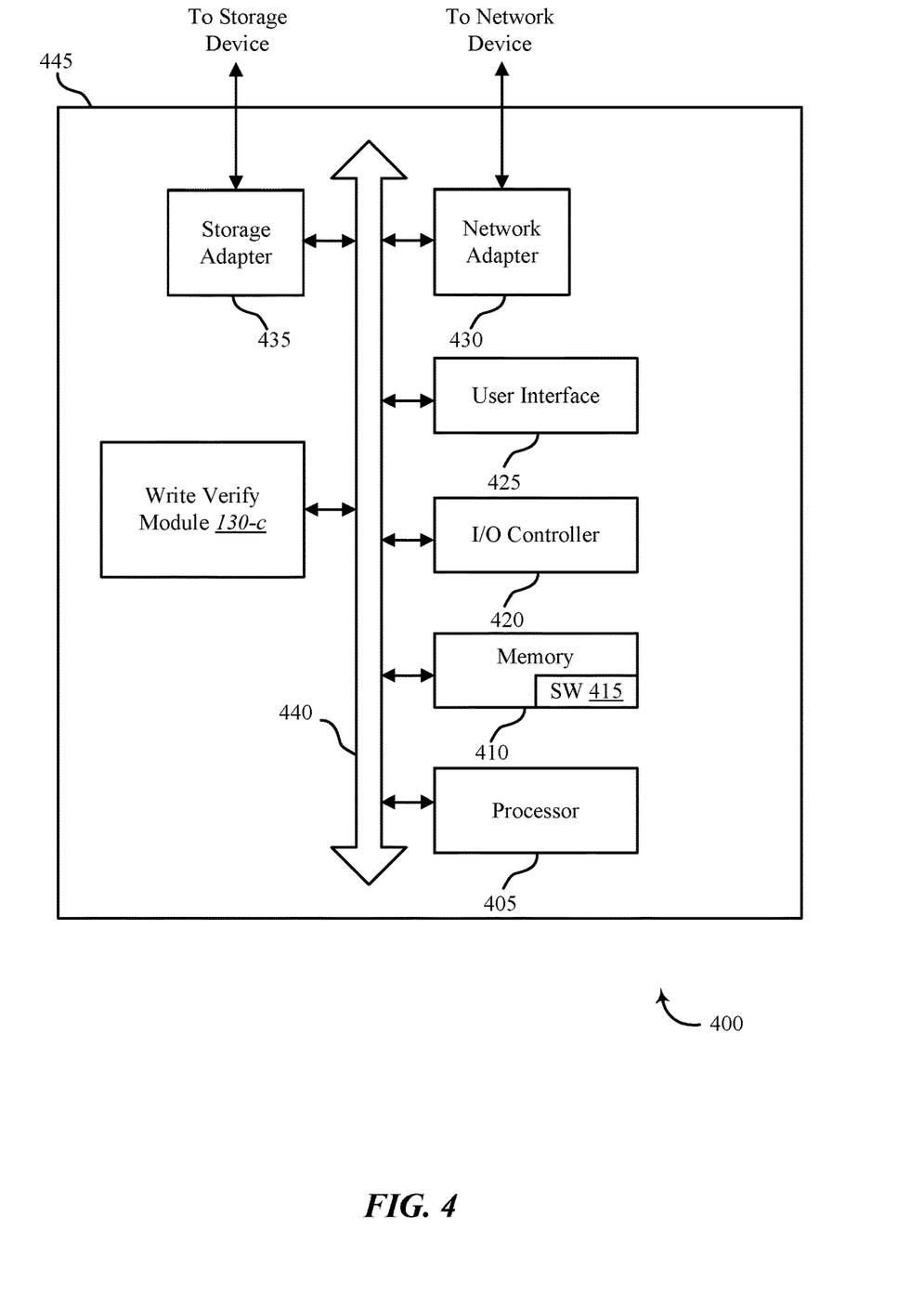
FIG. 4 shows a diagram of a system in accordance with various aspects of this disclosure.

FIG. 4 shows a system 400 for redundant write transfer detection, in accordance with various examples. System 400 may include an apparatus 445, which may be an example of any one of device 105 of FIG. 1 and/or device 205 of FIG. 2.

Apparatus 445 may include components for bi-directional voice and data communications including components for transmitting communications and components for receiving communications. For example, apparatus 445 may communicate bi-directionally with one or more storage devices and/or client systems. This bi-directional communication may be direct (e.g., apparatus 445 communicating directly with a storage system) and/or indirect (e.g., apparatus 445 communicating indirectly with a client device through a server).

Apparatus 445 may also include a processor module 405, and memory 410 (including software/firmware code (SW) 415), an input/output controller module 420, a user interface module 425, a network adapter 430, and a storage adapter 435. The software/firmware code 415 may be one example of a software application executing on apparatus 445. The network adapter 430 may communicate bi-directionally— via one or more wired links and/or wireless links—with one or more networks and/or client devices. In some embodiments, network adapter 430 may provide a direct connection to a network device via a direct network link to the Internet via a POP (point of presence). In some embodiments, network adapter 430 of apparatus 445 may provide a connection using wireless techniques, including digital cellular telephone connection, Cellular Digital Packet Data (CDPD) connection, digital satellite data connection, and/or another connection. The apparatus 445 may include a write verify module 130-c, which may perform the functions described above for the write verify module 130 of FIGS. 1, 2, and/or 3.

The signals associated with system 400 may include wireless communication signals such as radio frequency, electromagnetics, local area network (LAN), wide area network (WAN), virtual private network (VPN), wireless network (using 802.11, for example), cellular network (using 3G and/or LTE, for example), and/or other signals. The network adapter 430 may enable one or more of WWAN (GSM, CDMA, and WCDMA), WLAN (including BLUETOOTH® and Wi-Fi), WMAN (WiMAX) for mobile communications, antennas for Wireless Personal Area Network (WPAN) applications (including RFID and UWB), etc.

One or more buses 440 may allow data communication between one or more elements of apparatus 445 (e.g., processor module 405, memory 410, I/O controller module 420, user interface module 425, network adapter 430, and storage adapter 435, etc.).

The memory 410 may include random access memory (RAM), read only memory (ROM), flash RAM, and/or other types. The memory 410 may store computer-readable, computer-executable software/firmware code 415 including instructions that, when executed, cause the processor module 405 to perform various functions described in this disclosure. Alternatively, the software/firmware code 415 may not be directly executable by the processor module 405 but may cause a computer (e.g., when compiled and executed) to perform functions described herein. Alternatively, the computer-readable, computer-executable software/firmware code 415 may not be directly executable by the processor module 405, but may be configured to cause a computer (e.g., when compiled and executed) to perform functions described herein. The processor module 405 may include an intelligent hardware device, e.g., a central processing unit (CPU), a microcontroller, an application-specific integrated circuit (ASIC), etc.

In some embodiments, the memory 410 may contain, among other things, the Basic Input-Output system (BIOS) which may control basic hardware and/or software operation such as the interaction with peripheral components or devices. For example, at least a portion of the write verify module 130-c to implement the present systems and methods may be stored within the system memory 410. Applications resident with system 400 are generally stored on and accessed via a non-transitory computer readable medium, such as a hard disk drive or other storage medium. Additionally, applications can be in the form of electronic signals modulated in accordance with the application and data communication technology when accessed via a network interface (e.g., network adapter 430, etc.). In some embodiments, memory 410 may store attributes of data sets (e.g., data set attributes 135 of FIG. 1).

Many other devices and/or subsystems may be connected to one or may be included as one or more elements of system 400 (e.g., personal computing device, mobile computing device, smart phone, server, internet-connected device, cell radio module, and so on). In some embodiments, all of the elements shown in FIG. 4 need not be present to practice the present systems and methods. The devices and subsystems can be interconnected in different ways from that shown in FIG. 4. In some embodiments, an aspect of some operation of a system, such as that shown in FIG. 4, may be readily known in the art and are not discussed in detail in this application. Code to implement the present disclosure can be stored in a non-transitory computer-readable medium such as one or more of system memory 410 or other memory. The operating system provided on I/O controller module 420 may be a mobile device operation system, a desktop/laptop operating system, or another known operating system.

The I/O controller module 420 may operate in conjunction with network adapter 430 and/or storage adapter 435. The network adapter 430 may enable apparatus 445 with the ability to communicate with client devices (e.g., device 105 of FIG. 1), and/or one or more network devices. Network adapter 430 may provide wired and/or wireless network connections. In some cases, network adapter 430 may include an Ethernet adapter or Fibre Channel adapter. Storage adapter 435 may enable apparatus 445 to access one or more data storage devices (e.g., storage device 110). The one or more data storage devices may include two or more data tiers each. The storage adapter may include one or more of an Ethernet adapter, a Fibre Channel adapter, Fibre Channel Protocol (FCP) adapter, a SCSI adapter, and iSCSI protocol adapter.

Figure 5:
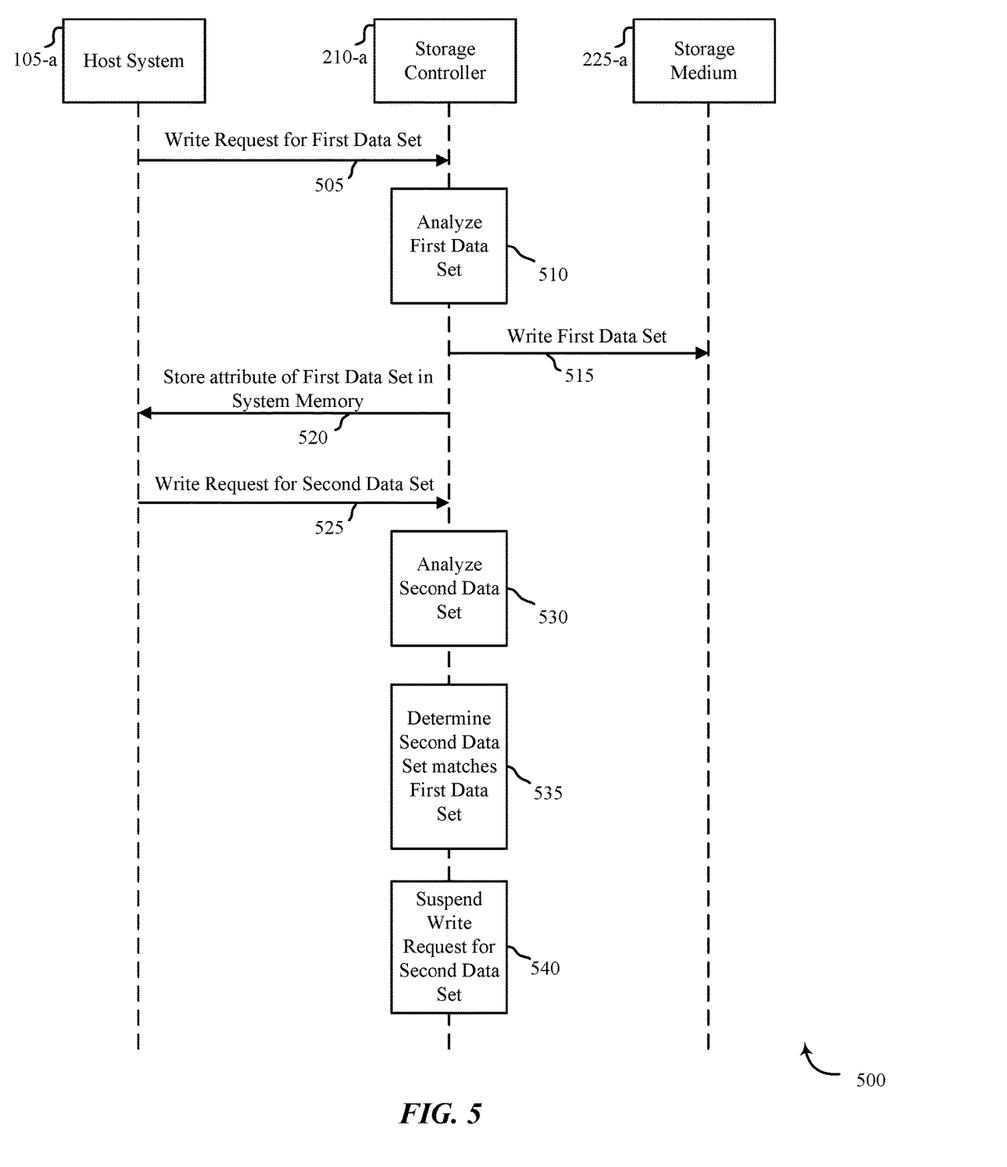
FIG. 5 shows one embodiment of a sequence diagram in accordance with various aspects of this disclosure.

FIG. 5 shows one embodiment of a sequence diagram 500 in accordance with various aspects of this disclosure. At least one aspect of diagram 500 may be implemented in conjunction with device 105 of FIG. 1, apparatus 205 of FIG. 2, and/or write verify module 130 depicted in FIGS. 1, 2, 3, and/or 4.

In one embodiment, environment 500 may include a host system 105-a, which may be one example of device 105 of FIG. 1, storage controller 210-a, which may be an example of storage controller 210 of FIG. 2, and storage medium, which may be an example of storage medium 225 of FIG. 2. As shown, at block 505, host system 105-a may send to storage controller 210-a a request to write a first data set to storage medium 225-a. At block 510, storage controller 210-a may analyze the first data set upon receiving the request. As part of this analysis, storage controller 210-a may identify one or more attributes of the first data set. Based on the identified one or more attributes, storage controller 210-a may determine whether the first data set is a copy of a data set already written to storage medium 225-a. As indicated, at block 515, storage controller 210-a writes the first data set to storage medium 225-a upon determining the first data set is not a copy of a data set already written to the storage medium 225-a. At block 520, storage controller 210-*a* stores one or more attributes of the first data set to system memory of host system 105-*a*.

In one embodiment, at block 525, host system 105-*a* may send a request to storage controller 210-*a* to write a second data set to storage medium 225-*a*. At block 530, storage controller 210-*a* may analyze the second data set. For example, storage controller 210-*a* may identify one or more attributes of the second data set and compare these identified attributes with attributes of data sets previously stored to storage medium 225-*a*. For example, as depicted at block 535, storage controller 210-*a* may determine that the identified one or more attributes of the second data set match the one or more attributes of the first data set stored to system memory at block 520. Upon determining the attributes of the first and second data sets match, storage controller 210-*a* may determine that the second data set matches the first data set. Accordingly, at block 540, storage controller 210-*a* may suspend the request to write the second data set to storage medium 525-*a*.

Figure 6:
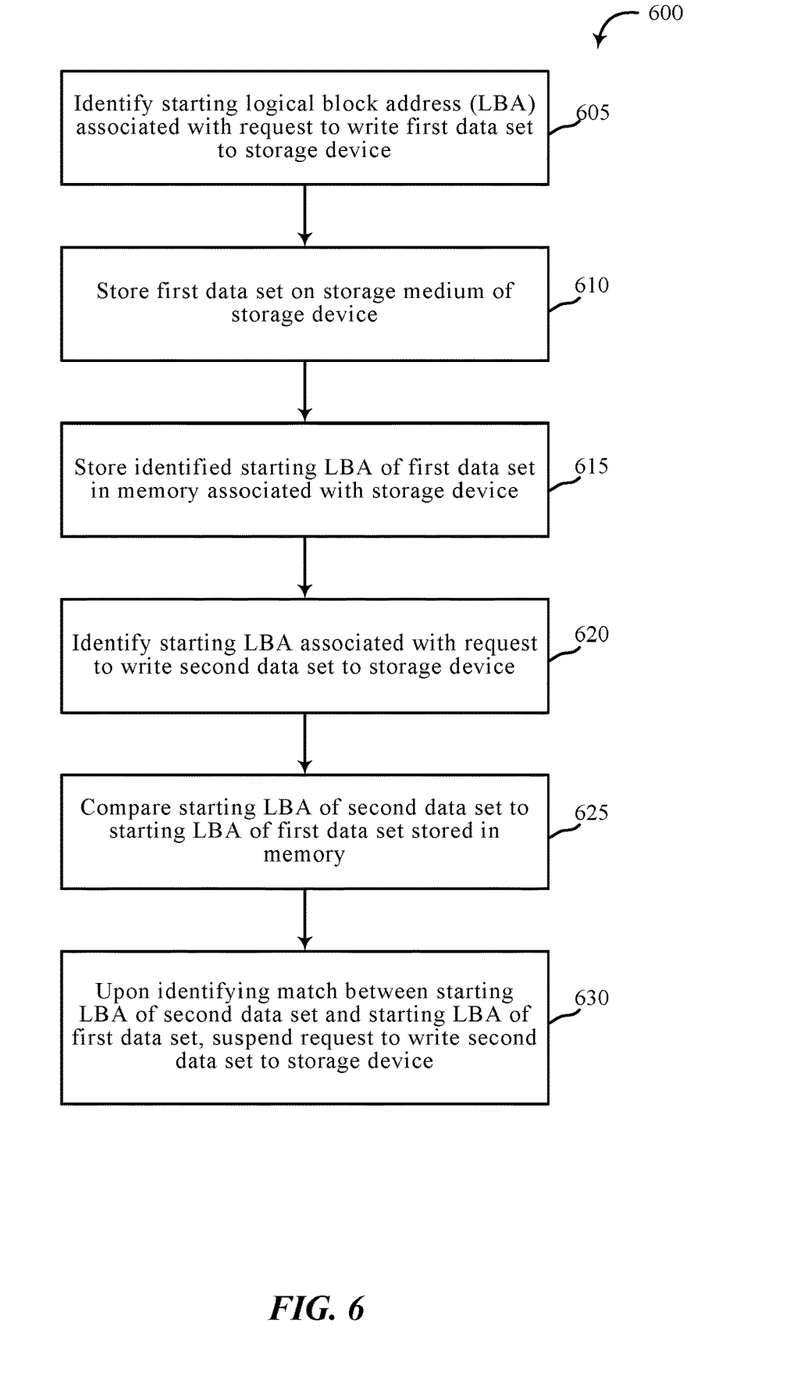
FIG. 6 is a flow chart illustrating an example of a method in accordance with various aspects of this disclosure.

FIG. 6 is a flow chart illustrating an example of a method 600 for redundant write transfer detection, in accordance with various aspects of the present disclosure. One or more aspects of the method 600 may be implemented in conjunction with device 105 of FIG. 1, apparatus 205 of FIG. 2, and/or write verify module 130 depicted in FIGS. 1, 2, 3, and/or 4. In some examples, a backend server, computing device, and/or storage device may execute one or more sets of codes to control the functional elements of the backend server, computing device, and/or storage device to perform one or more of the functions described below. Additionally or alternatively, the backend server, computing device, and/or storage device may perform one or more of the functions described below using special-purpose hardware.

At block 605, the method 600 may include identifying a starting logical block address (LBA) associated with a request to write a first data set to the storage device. At block 610, the method 600 may include storing the first data set on a storage medium of the storage device. At block 615, the method 600 may include storing the identified starting LBA of the first data set in a memory associated with the storage device. Additionally, or alternatively, the method 600 may include storing a checksum and/or parity value associated with the first data set. At block 620, the method 600 may include identifying a starting LBA associated with a request to write a second data set to the storage device. At block 625, the method 600 may include comparing the starting LBA of the second data set to the starting LBA of the first data set stored in the memory. Additionally, or alternatively, the method 600 may include comparing a checksum and/or parity value from the first data set with a checksum and/or parity value associated with the second data set. At block 630, upon identifying a match between the starting LBA of the second data set and the starting LBA of the first data set, the method 600 may include suspending the request to write the second data set to the storage device.

The operation(s) at block 605-630 may be performed using the write verify module 130 described with reference to FIGS. 1-4 and/or another module. Thus, the method 600 may provide for redundant write transfer detection relating to redundant write transfer detection. It should be noted that the method 600 is just one implementation and that the operations of the method 600 may be rearranged, omitted, and/or otherwise modified such that other implementations are possible and contemplated.

Figure 7:
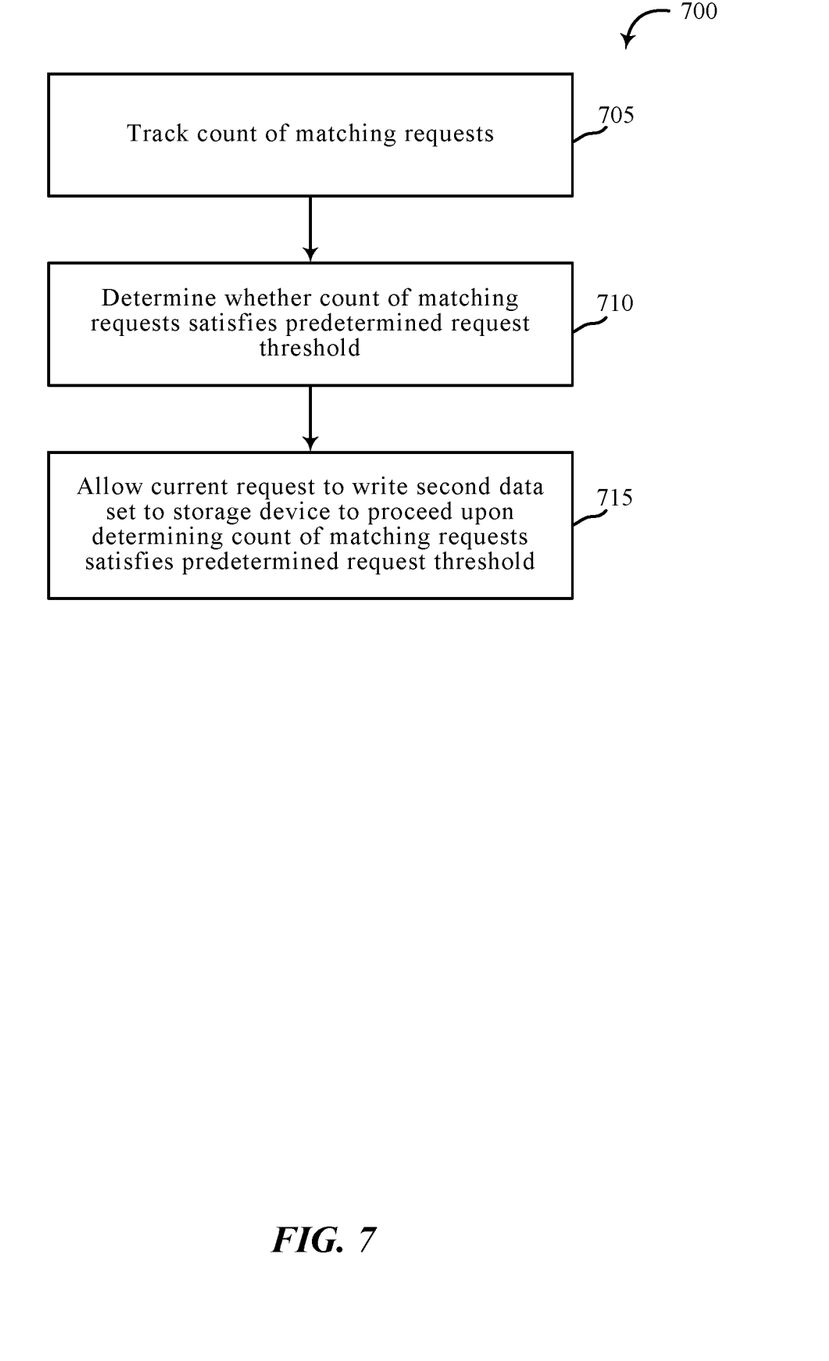
FIG. 7 is a flow chart illustrating an example of a method in accordance with various aspects of this disclosure.

FIG. 7 is a flow chart illustrating an example of a method 700 for redundant write transfer detection, in accordance with various aspects of the present disclosure. One or more aspects of the method 700 may be implemented in conjunction with device 105 of FIG. 1, apparatus 205 of FIG. 2, and/or write verify module 130 depicted in FIGS. 1, 2, 3, and/or 4. In some examples, a backend server, computing device, and/or storage device may execute one or more sets of codes to control the functional elements of the backend server, computing device, and/or storage device to perform one or more of the functions described below. Additionally or alternatively, the backend server, computing device, and/or storage device may perform one or more of the functions described below using special-purpose hardware.

At block 705, the method 700 may include tracking a count of matching requests. In some cases, the count of matching requests may include a count of a number of requests made to write a second data set that matches a first data set. The requests may occur after writing the first data set to the storage device. The second data set may be determined to match the first data set based on one or more identified attributes of the first and second data sets such as starting LBA, checksum, parity value, etc. At block 710, the method 700 may include determining whether the count of matching requests satisfies a predetermined request threshold. At block 715, the method 700 may include allowing a current request to write the second data set to the storage device to proceed upon determining the count of matching requests satisfies the predetermined request threshold.

The operations at blocks 705-715 may be performed using the write verify module 130 described with reference to FIGS. 1-4 and/or another module. Thus, the method 700 may provide for redundant write transfer detection relating to redundant write transfer detection. It should be noted that the method 700 is just one implementation and that the operations of the method 700 may be rearranged, omitted, and/or otherwise modified such that other implementations are possible and contemplated.

In some examples, aspects from two or more of the methods 600 and 700 may be combined and/or separated. It should be noted that the methods 600 and 700 are just example implementations, and that the operations of the methods 600 and 700 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to storage system applications. In some embodiments, the concepts, the technical descriptions, the features, the methods, the ideas, and/or the descriptions may specifically apply to storage and/or data security system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A storage device comprising:
  a storage controller operable to:
    identify a starting logical block address (LBA) associated with a request to write a first data set to the storage device, the LBA including an address to one or more data sectors of a hard disk of the storage device;

identify a parity value associated with the first data set, the parity value being based at least in part on a parity sector of the hard disk;

store the first data set on a storage medium of the storage device, the storage medium including at least one of a magnetic storage medium and a solid state storage medium;

store the identified starting LBA of the first data set in a memory associated with the storage device, the memory being separate from the storage medium of the storage device;

identify a starting LBA associated with a request to write a second data set to the storage device;

compare the starting LBA of the second data set to the starting LBA of the first data set stored in the memory; and upon identifying a match between the starting LBA of the second data set and the starting LBA of the first data set, suspend the request to write the second data set to the storage device.

2. The storage device of claim 1, wherein the storage controller is further operable to:

allow the request to write the second data set to the storage device to proceed upon identifying no match from the compare.

3. The storage device of claim 1, wherein the storage controller is further operable to:

identify a checksum associated with the first data set.

4. The storage device of claim 3, wherein the storage controller is further operable to:

store the identified checksum in the memory upon identifying the checksum of the first data set; and store the identified parity value in the memory upon identifying the parity value of the first data set.

5. The storage device of claim 4, wherein the storage controller is further operable to:

identify at least one of a checksum and a parity value associated with the second data set; and compare at least one of the checksum and parity value of the second data set to at least one of the stored checksum and stored parity value of the first data set.

6. The storage device of claim 5, wherein the storage controller is further operable to:

suspend the request to write the second data set to the storage device upon identifying a match between at least one of the checksum of the second data set and the stored checksum of the first data set, and the parity value of the second data set and the stored parity value of the first data set.

7. The storage device of claim 3, wherein the storage controller is further operable to:

track a count of matching requests, the count of matching requests comprising a count of a number of requests made to write a data set subsequent to the first data set that matches at least one of the starting LBA, checksum, and parity value of first data set.

8. The storage device of claim 7, wherein the storage controller is further operable to:

determine whether the count of matching requests satisfies a predetermined request threshold; and allow a current request to write a matching data set to the storage device to proceed upon determining the count of matching requests satisfies the predetermined request threshold.

9. The storage device of claim 5, wherein the storage controller is further operable to:

allow the request to write the second data set to the storage device to proceed upon identifying no match between at least one of the checksum and parity value of the second data set and the stored checksum and stored parity value of the first data set.

10. The storage device of claim 1, wherein the memory includes at least one of random access memory, flash memory, non-volatile memory, and volatile memory.

11. A method for a storage device, the method comprising:

identifying a starting logical block address (LBA) associated with a request to write a first data set to the storage device, the LBA including an address to one or more data sectors of a hard disk of the storage device;

identifying a parity value associated with the first data set, the parity value being based at least in part on a parity sector of the hard disk;

storing the first data set on a storage medium of the storage device, the storage medium including at least one of a magnetic storage medium and a solid state storage medium;

storing the identified starting LBA of the first data set in a memory associated with the storage device, the memory being separate from the storage medium of the storage device;

identifying a starting LBA associated with a request to write a second data set to the storage device;

comparing the starting LBA of the second data set to the starting LBA of the first data set stored in the memory; and upon identifying a match between the starting LBA of the second data set and the starting LBA of the first data set, suspending the request to write the second data set to the storage device.

12. The method of claim 11, comprising:

allowing the request to write the second data set to the storage device to proceed upon identifying no match from the comparing.

13. The method of claim 11, comprising:

identifying a checksum associated with the first data set.

14. The method of claim 13, comprising:

storing the identified checksum in the memory upon identifying the checksum of the first data set; and storing the identified parity value in the memory upon identifying the parity value of the first data set.

15. The method of claim 14, comprising:

identifying at least one of a checksum and a parity value associated with the second data set; and comparing at least one of the checksum and parity value of the second data set to at least one of the stored checksum and stored parity value of the first data set.

16. The method of claim 15, comprising:

suspending the request to write the second data set to the storage device upon identifying a match between at least one of the checksum of the second data set and the stored checksum of the first data set, and the parity value of the second data set and the stored parity value of the first data set.

17. The method of claim 13, comprising:

tracking a count of matching requests, the count of matching requests comprising a count of a number of requests made to write a data set subsequent to the first data set that matches at least one of the starting LBA, checksum, and parity value of first data set.

18. The method of claim 15, comprising:

allowing the request to write the second data set to the storage device to proceed upon identifying no match between at least one of the checksum and parity value of the second data set and the stored checksum and stored parity value of the first data set.

19. A storage device comprising:

a processor;

memory in electronic communication with the processor, the memory stores computer executable instructions that when executed by the processor cause the processor to perform the steps of:

receiving a request to write a first data set to the storage device;

identifying an attribute of the first data set, the attribute of the first data set including a starting logical block address (LBA) associated with the request to write the first data set, the LBA including an address to one or more data sectors of a hard disk of the storage device;

identifying a parity value associated with the first data set, the parity value being based at least in part on a parity sector of the hard disk;

storing the first data set on a storage medium of the storage device, the storage medium including at least one of a magnetic storage medium and a solid state storage medium;

storing the identified attribute of the first data set in a memory associated with the storage device, the memory being separate from the storage medium of the storage device;

receiving a request to write a second data set to the storage device;

identifying an attribute of the second data set;

comparing the identified attribute of the second data set to the identified attribute of the first data set stored in the memory; and upon identifying a match between the identified attribute of the second data set and the identified attribute of the first data set, suspending the request to write the second data set to the storage device.

20. The storage device of claim 19, wherein the instructions executed by the processor cause the processor to perform the steps of:

allowing the request to write the second data set to the storage device to proceed upon identifying no match from the comparing.

* * * * *